(12) United States Patent
Anschutz et al.

(10) Patent No.: US 7,813,353 B2
(45) Date of Patent: Oct. 12, 2010

(54) METHODS, SYSTEMS, AND COMPUTER PROGRAM PRODUCTS FOR MANAGING QUALITY OF SERVICE IN A PASSIVE OPTICAL NETWORK

(75) Inventors: Thomas Arnold Anschutz, Conyers, GA (US); Zhi Cui, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 107 days.

(21) Appl. No.: 12/254,114

(22) Filed: Oct. 20, 2008

(65) Prior Publication Data

US 2009/0103545 A1 Apr. 23, 2009

Related U.S. Application Data

(60) Provisional application No. 60/981,230, filed on Oct. 19, 2007.

(51) Int. Cl.
*H04L 12/43* (2006.01)
*H04J 3/16* (2006.01)
*H04J 3/22* (2006.01)

(52) U.S. Cl. .............. 370/398; 370/458; 370/468; 370/432; 398/67; 398/71

(58) Field of Classification Search ......... 370/230–237, 370/352–395, 401–458; 398/58–67, 71–79; 709/224–228
See application file for complete search history.

(56) References Cited

U.S. PATENT DOCUMENTS

| | | | | |
|---|---|---|---|---|
| 7,385,995 B2 * | 6/2008 | Stiscia et al. | ............... | 370/412 |
| 7,573,897 B2 * | 8/2009 | Elmoalem et al. | ........... | 370/458 |
| 7,593,418 B1 * | 9/2009 | Benhaim et al. | ............ | 370/432 |
| 7,639,905 B2 * | 12/2009 | Ikeda et al. | .................... | 385/16 |
| 7,643,753 B2 * | 1/2010 | Weitz et al. | ................... | 398/67 |
| 2007/0133998 A1 * | 6/2007 | Xia et al. | ..................... | 398/155 |
| 2007/0140258 A1 * | 6/2007 | Tan et al. | ............... | 370/395.21 |
| 2007/0297446 A1 * | 12/2007 | Siwko et al. | ................ | 370/468 |
| 2008/0205443 A1 * | 8/2008 | Shi et al. | .................... | 370/468 |
| 2008/0273878 A1 * | 11/2008 | Wu et al. | ...................... | 398/67 |
| 2009/0226170 A1 * | 9/2009 | Zou | ............................ | 398/79 |
| 2010/0008379 A1 * | 1/2010 | Yoo et al. | ................... | 370/468 |
| 2010/0027561 A1 * | 2/2010 | Greborio et al. | ............ | 370/468 |

OTHER PUBLICATIONS

Cohen et al., "Migration to Ethernet-Based DSL Aggregation", Architecture and Transport Working Group, Technical Report DSL Forum, Apr. 2006.

International Telecommunication Union, "Series G: Transmission Systems and Media, Digital Systems and Networks-Digital Sections and Digital Line System-Optical Line Systems for Local and Access Networks", ITU-T Recommendation G.984.3, Feb. 2004.

(Continued)

*Primary Examiner*—Man Phan
(74) *Attorney, Agent, or Firm*—Myers Bigel Sibley & Sajovec, P.A.

(57) ABSTRACT

Quality of Service (QoS) can be managed in a network that uses time division access, such as a Passive Optical Network (PON), by supporting provisioning of at least two scheduling precedence levels in the PON, none of the at least two precedence levels being associated with a fixed or assured bandwidth traffic type in the PON, but having a bandwidth precedence and/or proportion relationship to each other.

17 Claims, 4 Drawing Sheets

OTHER PUBLICATIONS

International Telecommunication Union, "Series G: Transmission Systems and Media, Digital Systems and Networks-Digital Sections and Digital Line System-Optical Line Systems for Local and Access Networks", ITU-T Recommendation G.984.3 Amendment 2, Mar. 2006.

International Telecommunication Union, "Series G: Transmission Systems and Media, Digital Systems and Networks-Digital Sections and Digital Line System-Optical Line Systems for Local and Access Networks", ITU-T Recommendation G.984.3 Amendment 3, Dec. 2006.

* cited by examiner

METHODS, SYSTEMS, AND COMPUTER PROGRAM PRODUCTS FOR MANAGING QUALITY OF SERVICE IN A PASSIVE OPTICAL NETWORK

CROSS-REFERENCE TO RELATED APPLICATION

This application claims the benefit of and priority to U.S. Provisional Patent Application No. 60/981,230, filed Oct. 19, 2007, the disclosure of which is hereby incorporated herein by reference as if set forth in its entirety.

FIELD OF THE INVENTION

The present invention relates to communication networks, and, more particularly, to managing Quality of Service (QoS) in communication networks.

BACKGROUND

The Internet is a decentralized network of computers that can communicate with one another via the Internet protocol (IP). Although the Internet has its origins in a network created by the Advanced Research Project Agency (ARPA) in the 1960's, it has only recently become a worldwide communication medium. To a large extent, the explosive growth in use and traffic over the Internet is due to the development in the early 1990's of the worldwide Web (WWW), which is one of several service facilities provided on the Internet. Other facilities include a variety of communication services such as electronic mail, telnet, Usenet newsgroups, internet relay chat (IRC), a variety of information search services such as WAIS and Archie, and a variety of information retrieval services such as FTP (file transfer protocol) and Gopher.

The WWW is a client-server based facility that includes a number of servers (computers connected to the Internet) on which Web pages or files reside, as well as clients (Web browsers), which interface the users with the Web pages. Specifically, Web browsers and software applications send a request over the WWW to a server requesting a Web page identified by a Uniform Resource Locator (URL) which notes both the server where the Web page resides and the file or files on that server which make tip the Web page. The server then sends a copy of the requested file(s) to the Web browser, which in turn displays the Web page to the user.

The topology of the WWW can be described as a network of networks, with providers of network service called Network Service Providers, or NSPs. Servers that provide application-layer services as previously described may be described as Application Service Providers (ASPs). Sometimes a single service provider does both functions within a single business In recent years, broadband access technologies, such as digital subscriber line (DSL), cable modems, asynchronous transfer mode (ATM), and frame relay have facilitated the communication of voice, video, and data over the Internet and other public and private networks. Because broadband technologies are typically deployed by a single transport service provider, like a Regional Bell Operating Company (RBOC), their Regional and Access Networks (RAN) are often shared by many NSPs and ASPs offering services that range from Internet access and VPN access to Voice over IP, Video on Demand, and Gaming. Up until recently, a given Customer Premises Network (CPN) would have been connected to a single service provider in a generic way; however a new standard for RAN service (Broadband Forum TR-059) provides a RAN architecture that allows simultaneous access to multiple NSPs and ASPs and for differentiating the data transport service provided by a RAN to these service providers.

Moreover, broadband access technology has allowed service providers to expand their content and service offerings to both business and home users. For example, a user may subscribe to multiple services or applications, such as voice service, Internet access service, a video service, a gaming service, etc. from one or more service providers. These services and/or applications may be delivered over a single network connection, such as a DSL line. Unfortunately, with multiple new connectivity options and applications that require specific characteristics from the network, there may also a need to establish QoS standards and/or bandwidth allocation among multiple services and/or applications so as to customize the content delivery according to the users' and/or providers' preferences.

Different broadband technologies, however, may have different QoS standards associated therewith. For example, ATM networks manage bandwidth and QoS on a connection basis. By contrast, IP and Ethernet networks manage QoS/bandwidth on a frame by frame approach. Broadband Forum Technical Report 101 (TR-101) entitled "Migration to Ethernet-based DSL Aggregation," of April, 2006 describes a possible migration process from an ATM based aggregation network to an Ethernet based aggregation network. A goal of the Broadband Forum's TR-156 document is to make use of Gigabit Passive Optical Network (GPON) access nodes in the TR-101 architecture. Other network architectures, such as PON architectures, however, may not provide the same QoS capabilities as that provided for in the TR-101 architecture.

SUMMARY

According to some embodiments, Quality of Service (QoS) can be managed in a network that uses time division access by supporting provisioning of at least two scheduling precedence levels in the network, none of the at least two precedence levels being associated with a fixed or assured bandwidth traffic type in the network, but having a bandwidth precedence and/or proportion relationship to each other.

In other embodiments, the network supports the fixed bandwidth traffic type, an assured traffic type, an un-assured traffic type, and a best-effort traffic type. The method further includes supporting assignment of at least one type-4 transmission container (T-CONT) to at least one of the precedence levels and supporting assignment of best-effort traffic in at least one other type-4 or type-5 T-CONT to at least one of the precedence levels.

In still other embodiments, the method further includes provisioning an assured traffic type T-CONT associated with a first one of the precedence levels, provisioning an un-assured traffic type T-CONT associated with a second one of the precedence levels, provisioning a first best-effort traffic type T-CONT associated with a third one of the precedence levels, and provisioning a second best-effort traffic type T-CONT associated with a fourth one of the precedence levels.

In still other embodiments, the method further includes provisioning a first best-effort traffic type T-CONT associated with a first one of the precedence levels, provisioning a second best-effort traffic type T-CONT associated with a second one of the precedence levels, provisioning a third best-effort traffic type T-CONT associated with a third one of the precedence levels, and provisioning a fourth best-effort traffic type T-CONT associated with a fourth one of the precedence levels.

In still other embodiments, the method further includes provisioning a first type-5 T-CONT for carrying assured type traffic, un-assured type traffic, and a first best-effort type traffic, which are associated with a first, second, and third one of the precedence levels, respectively and provisioning of a second T-CONT for carrying a second best-effort type traffic, which is associated with a fourth one of the precedence levels.

In still other embodiments, the method further includes supporting provisioning of weights among the type-4 T-CONTs and the best effort traffic in the type-5 T-CONTs that are assigned to a same one of the precedence levels and supporting scheduling transmission of the type-4 T-CONTs and the best effort traffic in the type-5 T-CONTs that are assigned to the same one of the precedence levels when bandwidth is available for the same one of the precedence levels.

In still other embodiments, the network is a gigabit Passive Optical Network (GPON) network.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described herein in the context of managing quality of service (QoS). As used herein, QoS includes, but is not limited to, treatment applied to an access session, data flow, and/or packet with respect to scheduling a resource, bandwidth allocation, and/or delivery target in an individual element or across an end-to-end system. Moreover, embodiments of the present invention are described herein with reference to a gigabit Passive Optical Network (GPON) architecture. It will be understood that the present invention is not limited to such embodiments, but may be embodied generally in any network that uses time division access technology.

Figure 1:
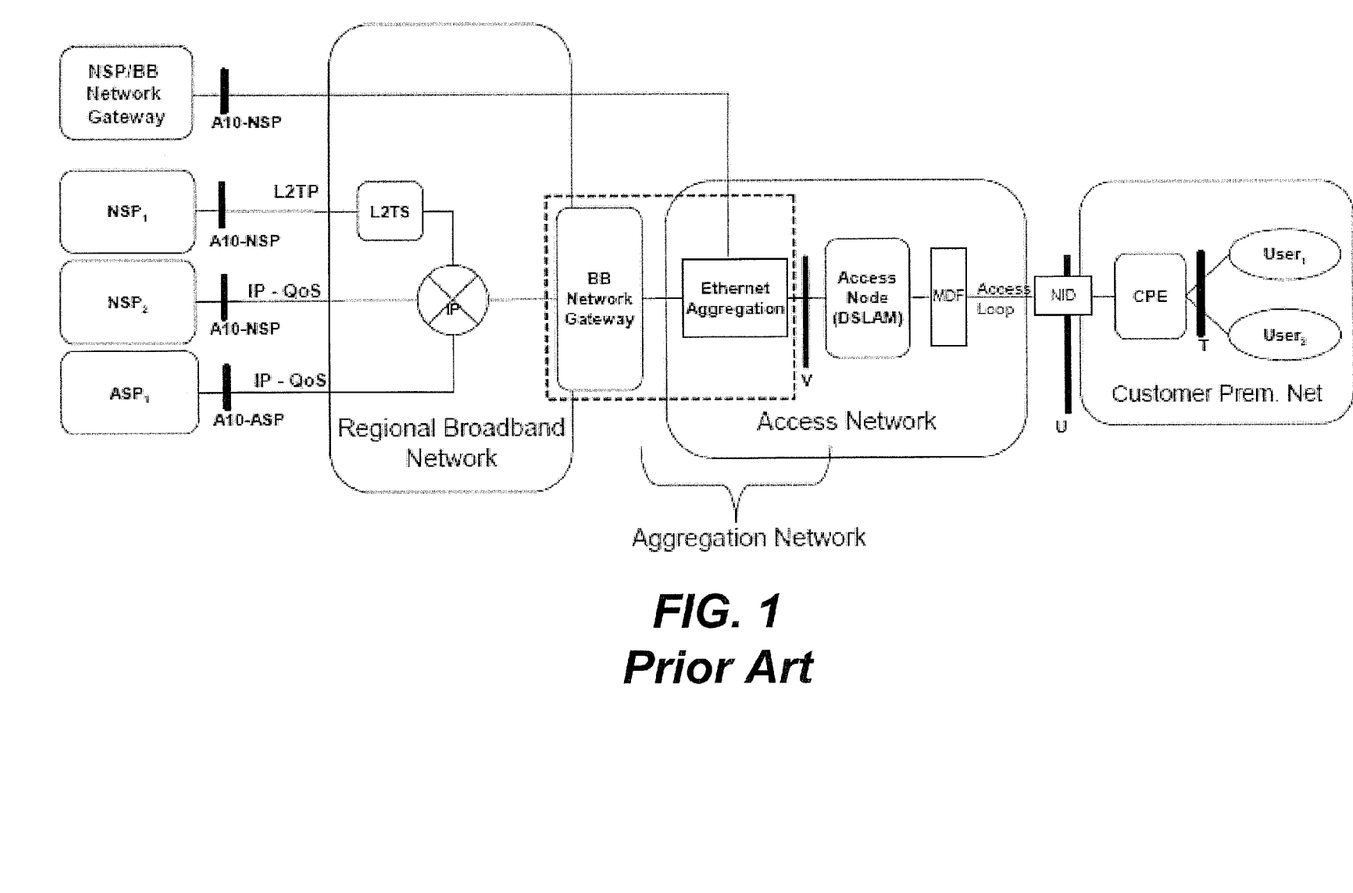
FIG. 1 is a block diagram that illustrates a conventional Ethernet-based aggregation communication network in accordance with some embodiments.

Referring to FIG. 1, an Ethernet-based aggregation network architecture includes Network Service Providers (NSPs) and Application Service Providers (ASPs) that are connected to a Broadband Network Gateway (BNG) through a Regional Broadband Network. The BNG is coupled to an Access Network that includes an Ethernet Aggregation Network, which is coupled to Customer Premises Equipment (CPE) in a Customer Premises Network by way of an Access Node, such as a Digital Subscriber Line Access Multiplexer (DSLAM). The Broadband Forum TR-101 architecture shown in FIG. 1 differs from architecture described in the Broadband Forum's Technical Report 059 (TR-059) entitled "DSL Evolution—Architecture Requirements for the Support of QoS Enabled IP Services" in that the Broadband Remote Access Server (BRAS) is replaced with the BNG and ATM function/element is replaced with the Ethernet Aggregation function/module replaces the ATM function/element.

Figure 2:
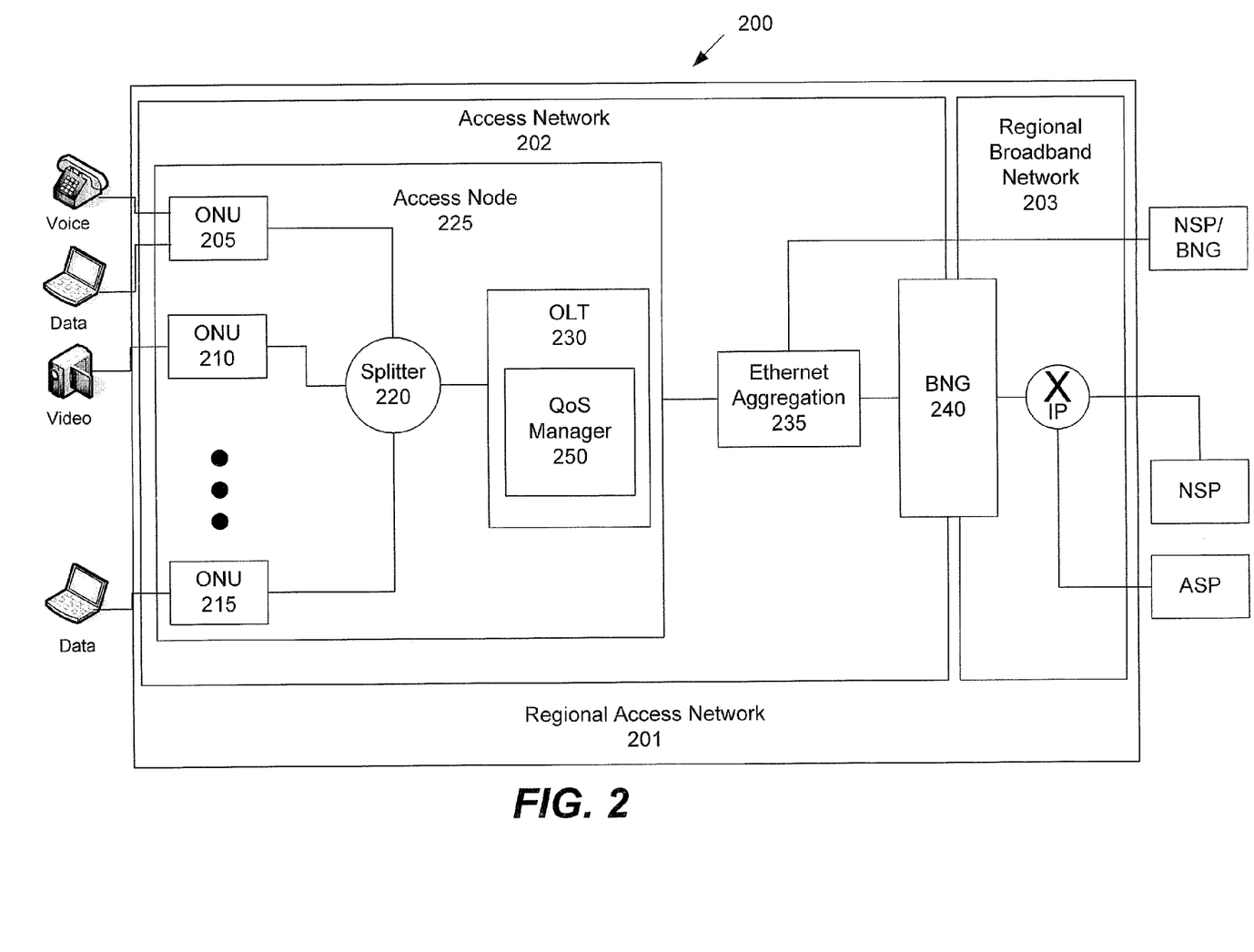
FIG. 2 is a block diagram that illustrates a Passive Optical Network (PON) in accordance with some embodiments.

FIG. 2 illustrates a network architecture for a Passive Optical Network (PON), such as a Gigabit PON (GPON) in accordance with some embodiments. The GPON network 200 includes a Regional Access Network (RAN) 201 that includes an Access Network 202 and a Regional Broadband Network 203. The Access Node 225 includes multiple Optical Network Units/Optical Network Terminations (ONUs/ONTs) 205, 210, and 215 that couple Customer Premise Equipment (CPE), such as voice, data, and/or video equipment to an optical splitter (Optical Distribution Network (ODN)) 220. The optical splitter 220 is coupled to an Optical Line Termination unit 230. The OLT 230 couples the Access Node 225 to an Ethernet Aggregation module 235 in the Access Network 202. The Ethernet Aggregation module 235 is coupled to the Regional Broadband Network 203 via a BNG 240. Various Network Service Providers (NSPs) and/or Application Service Providers (ASPs) are coupled to the Regional Broadband Network 203 and the BNG 240 by an IP multiplexer. NSPs including or coupled with BNG functionality may connect directly to the Ethernet Aggregation module 235 in the Access Network 202 as shown.

The OLT 230, according to some embodiments, may include a QoS manager 250 that may be configured to provide IP/Ethernet QoS functionality, such as that described in the TR-101 standard. Accordingly, the Access Node 225 and the OLT 230 may be an injection point for providing policy management and QoS in the GPON network 200. The GPON network 200 broadcasts traffic downstream towards the ONUs 205, 210, and 215 and may use Time Division Multiple Access (TDMA) for upstream traffic towards the Access Node 225. The Regional Broadband Network 203 may provide data rates at the E1/T1 levels and/or at Gigabit Ethernet (GbE) levels for various NSPs and/or ASPs.

Although FIG. 2 illustrates an exemplary communication network, it will be understood that the present invention is not limited to such configurations, but is intended to encompass any configuration capable of carrying out the operations described herein. It will be appreciated that, in accordance with some embodiments, the functionality of the Access Node 225 and the OLT 230 may be implemented using discrete hardware components, one or more application specific integrated circuits (ASICs), a programmed digital signal processor or microcontroller, a program stored in a memory and executed by a processor, and/or combinations thereof. In this regard, computer program code for carrying out operations of the Access Node 225 and the OLT 230 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even microcode to enhance performance and/or memory usage.

It will be further understood that the functionality of the Access Node 225 and the OLT 230 may be implemented in other network elements outside of the Access Node 225 and/or partially in the Access Node 225/OLT 230 and partially in other network elements.

As discussed above, it is a goal of the Broadband Forum's TR-156 document to make use of GPON access nodes in the TR-101 architecture. The conventional GPON architecture, however, does not provide the same traffic policy management and QoS as that used in TR-101 based communication networks. The Access Node 225, which includes the OLT 230 configured with a QoS manager 250, according to some embodiments, may be used to provide TR-101 traffic policy management and QoS functionality in a GPON communication network environment. Various QoS requirements for TR-101 networks will now be reviewed along with the approach to QoS used in GPON networks. Techniques for providing TR-101 based traffic policy management and QoS in a GPON network according to some embodiments will then be described.

The TR-101 QoS requirements are as follows:

R-45 The Access Node MUST support at least 4 traffic classes for Ethernet frames, and MUST support configurable mapping to these classes from the 8 possible values of the Ethernet priority field.

R-46 The Access Node SHOULD support at least 6 traffic classes for Ethernet frames, and MUST support configurable mapping to these classes from the 8 possible values of the Ethernet priority field.

R-47 The Access Node MUST support drop precedence within at least 2 traffic classes and MUST support configurable mapping to these classes and drop precedence from the 8 possible values of the Ethernet priority field.

Figure 3:
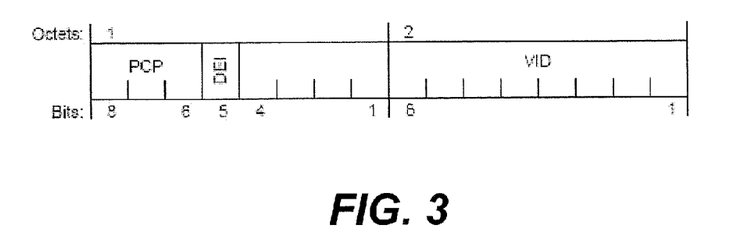
FIG. 3 is a diagram of an Ethernet header.

R-48 The Access Node SHOULD support direct indication of drop precedence within all supported traffic classes based on the DEI bit value of the Ethernet header. See, FIG. 3.

R-49 The Access Node MUST support at least 4 queues per user facing port, one per traffic class.

Note: User-facing ports share a single set of queues across all VLANs. This does not imply 4 queues per VLAN.

R-50 The Access Node SHOULD support at least 6 queues per user facing port, one per traffic class.

R-51 The Access Node MUST support scheduling of user queues according to strict priority among at least 4 queues.

R-52 The Access Node SHOULD support scheduling of user queues according to their assigned priority and weight. The number of priorities MUST be at least 4, however multiple queues may be assigned to the same priority. Queues assigned to the same priority MUST be scheduled according to a weighted algorithm (like WFQ) with weights assigned through provisioning. This mechanism provides support for mapping diffserv PHBs (e.g. EF, AF, BE, LE) to the Ethernet queues.

An example for a system that supports 4 queues is shown in Table 1 below. In Table 1, Queue 1 is scheduled at the highest priority, and since there are no other queues at that level, its weight is ignored. Queue 2 is similarly scheduled at priority 2. Once these two queues are exhausted, Queues 3 and 4 are scheduled with a weight ratio of 150:1. This approach is identical to the queuing arrangement standardized by the DSL Forum for RGs.

TABLE 1

| Priority 1 | Queue 1 - 100 |
|---|---|
| Priority 2 | Queue 2 - 15000 |
| Priority 3 | Queue 3 - 15000 |
|  | Queue 4 - 100 |
| Priority 4 |  |

R-53 The Access Node MUST support at least 4 queues per network facing port, one per traffic class.

R-54 The Access Node SHOULD support at least 6 queues per network facing port, one per traffic class.

R-55 The Access Node MUST support scheduling of network queues according to strict priority among at least 4 queues.

R-56 The Access Node SHOULD support scheduling of network queues according to their assigned priority and weight. The number of priorities MUST be at least 4, however multiple queues may be assigned to the same priority. Queues assigned to the same priority MUST be scheduled according to a weighted algorithm (like WFQ) with weights assigned through provisioning. This mechanism provides support for mapping diffserv PHBs (e.g. EF, AF, BE, LE) to the Ethernet queues.

R-57 The Access Node MUST support setting the maximum size/depth of all queues.

Reviewing these requirements and recognizing that the issue is all about upstream traffic scheduling, and not downstream user port scheduling, R-49 through R-52 can be ignored for this analysis. Furthermore, R-53 through R-56 originally applied to the network interface from the Access Network (AN), and, therefore, may still apply to that interface in a GPON OLT. However, these requirements do not specify an underlying assumption: that the internal pathways and fabric of the AN can be assumed to be non-blocking and do not congest before the network interface. This may no longer be a valid assumption for GPON, so these requirements may now also apply to the northbound, i.e., upstream, interface of an ONU, and therefore to the (Transmission Container) T-CONT scheduling mechanism. Note that there are MUST and SHOULD requirements, and any GPON solution MUST support the MUST requirement, and SHOULD support the SHOULD requirements.

GPON uses T-CONTs for the traffic management of upstream bandwidth allocation. There are 5 T-CONT types; each is targeted for different type of traffic as shown in 2. Furthermore, the Delay Sensitive characteristic is assumed to be on the order of magnitude to maintain timing integrity of a T1/E1 TDM interface, and that the "No" entries are still suitable for support of VoIP and Gaming applications, which are often described as delay sensitive, but at an order of magnitude less than the aforementioned TDM technologies.

TABLE 2

T-CONT Types

|  | Delay Sensitive | Type 1 | Type 2 | Type 3 | Type 4 | Type 5 |
|---|---|---|---|---|---|---|
| Fixed | Yes | x |  |  |  | x |
| Assured | No |  | x | x |  | x |
| Non-assured | No |  |  | x |  | x |
| Best-effort | No |  |  |  | X | x |

Figure 4:
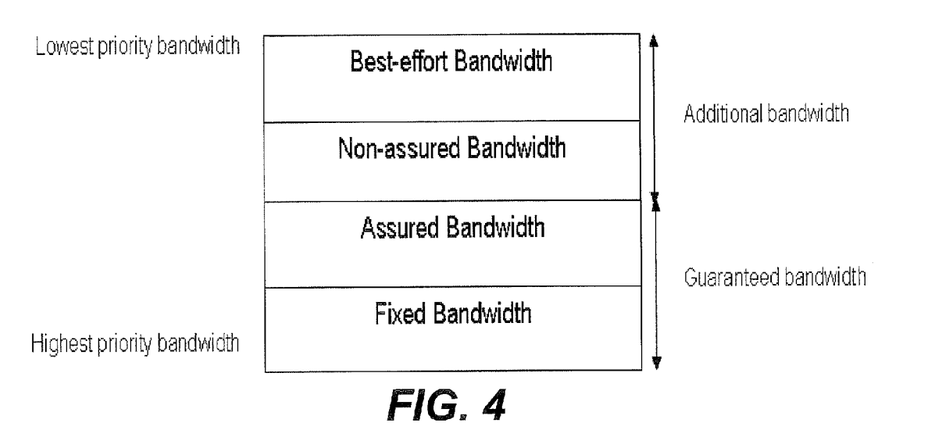
FIG. 4 is a diagram that illustrates priority between traffic types carried by Transmission Containers (T-CONTs)

DBA is used for dynamic upstream bandwidth allocation to improve the bandwidth efficiency by dynamically adjusting the bandwidth among the ONUs in response to ONU bursty traffic requirements. The dynamic adjustment of the upstream bandwidth assignment is through OLT monitoring or the buffer status report on each or combination of assured, non-assured, BE traffic for each T-CONT from ONUs. The priority hierarchy for data grants to T-CONTs is shown in FIG. 4.

In the bandwidth assignment, fixed bandwidth is reserved first. However, it is often used for POTS and TDM services which are out of the scope of TR-156 and also it is a non-work-conserving allocation, and not generally suitable to the goals of aggregating bursty data traffic using statistical multiplexing.

Assured bandwidth, if needed, is allocated next using up to all the remaining bandwidth. This traffic class supports work-conserving treatment and may also be a good fit for traffic that needs top precedence. An assured bandwidth T-CONT may make a fine top level of precedence. If bandwidth is still available, then non-assured bandwidth is allocated. Finally, the last allocation is for best effort bandwidth, making this a fine bottom level of precedence.

Multiple type-3 (Assured+Non-Assured) T-CONTs may be used to synthesize more priority classes, but this mechanism may create an inexact emulation of precedence, and may allocate undesired bandwidth to lower precedence classes in times of congestion.

There does not seem to be a drop in precedence capability. Some amount of weighting, however, can be applied to T-CONTs by assigning bandwidths among them. This, however, may lock up small amounts of assured bandwidth to set the weights. Best Effort bandwidth T-CONTs may be used to provide the lowest priority level.

Based on the above review of GPON QoS and TR-101 QoS, the two approaches can be compared to determine gaps in the two approaches so that a framework, according to some embodiments, can be developed to provide TR-101 traffic policy management and QoS in a GPON environment.

Broadband Forum's TR-156 document addresses data traffic only. Legacy POTS or TDM service is out of scope. Taking the MUST requirements it can be determined that a mechanism for providing TR-101 traffic policy management and QoS in a GPON environment may include the following characteristics:

The mechanism MUST support 4 queues with 4 classes of service that are scheduled in strict priority.

The mechanism MUST support drop precedence on at least 2 of these queues.

The system MUST be able to set the queue depth.

Now we can take the following reasoning:

As described above, the fixed bandwidth may not be work conserving and therefore a poor fit to support 4 levels of precedence for data traffic.

So, for data traffic, GPON offers three usable priorities: assured, non-assured, and best effort. A mapping between TR-101 priorities and these three GPON priorities constructed, but they will come up short one level of priority.

The requirement for support of drop precedence for at least 2 classes of service does not seem to have any readily usable mechanism in the GPON T-CONT scheduler, but may be implemented within the queues of a single ONU. There are no known requirements that express the need to sort through discard eligible traffic across ONUs. However distributed drop precedence across ONUs may be an expected behavior based on the TR-101 assumption of non-blocking internals in an AN.

To achieve additional priority levels and the drop precedence capability in a GPON communication network, such as the GPON network 200 of FIG. 2, multiple best effort T-CONTs may be used along with a few new requirements for scheduling among multiple best effort T-CONTs within the OLT 230, according to some embodiments. This may preserve the existing T-CONT scheduling mechanism by creating the new functionality in the unspecified area of scheduling multiple BE T-CONTs. There are several ways to implement this approach in accordance with various embodiments.

Note that an ONU can have one or more T-CONTs, with each representing a single CoS or a group of CoSs. There are two major implementation models of number of T-CONTs according to some embodiments: The 4+1 T-CONT model and 1+1 T-CONT model. The "+1" in these models is common, mainly used for Optical Management and Control Interface (OMCI), and will be ignored in the following discussion for simplicity.

The following sections present some example options including both T-CONT models according to some embodiments.

4+1 Model—Option A

Figure 5:
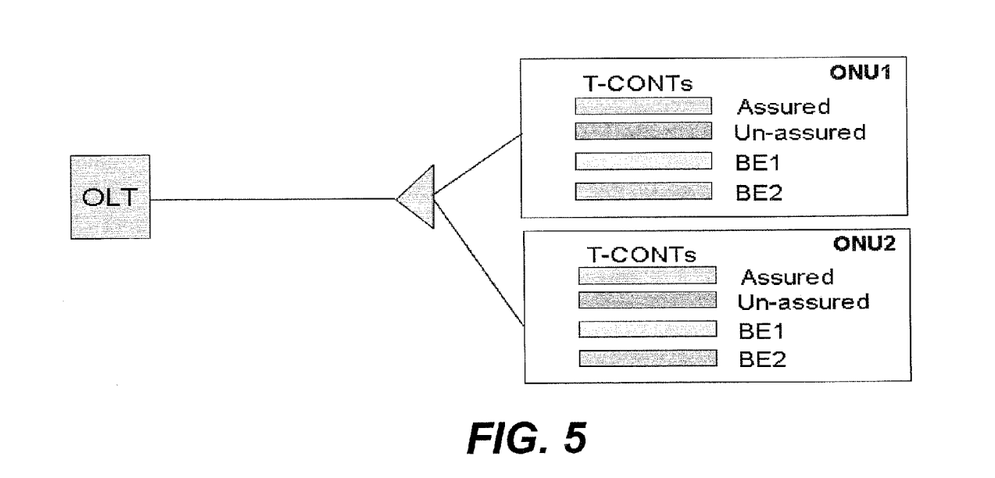
FIGS. 5-7 are block diagrams that illustrate management of QoS in a PON in accordance with some embodiments.

This option introduces an extra level of Best Effort class, as shown in FIG. 5 according to some embodiments. Priority levels for data in GPON, according to some embodiments, are listed below in the order from high to low:

Assured (type 2,3, or 5)
Un-assured (type 3, or 5)
BE1 (Best Effort) (type 4, or 5)
BE2 (Best Effort) (type 4, or 5)

Note: Un-assured traffic precedence can be achieved by using a type 3 T-CONT or a type 3 portion of a type 5 T-CONT, in which a small amount of assured BW is allocated to serve as a weight reference for Un-assured bandwidth allocation among different ONUs.

Exemplary requirements for the 4+1 model—Option A, according to some embodiments, are set forth below:

Proposed Requirements
R-58 The OLT MUST support provisioning at least two scheduling BE precedence levels and also allow assignment of BE T-CONTs to these precedence levels among all the BE T-CONTs in a GPON.

This behavior allows precedence scheduling among sets of identified BE T-CONTs, e.g. BE2 T-CONTs only get grants only if there is excess bandwidth available after allocating BE1 traffic T-CONTs. Also, some OLTs may automatically set up appropriate T-CONTs and others may have them provisioned explicitly. This behavior may need to take into account the number of provisioned precedence classes to operate as desired.

R-59 The OLT SHOULD support provisioning of weights among BE T-CONTs that share the same scheduling precedence level and then schedule (or allocate grants) according to these weights when bandwidth is available for the precedence level.

Applications: can be used for business and/or consumer applications—but this may confound weighting of assured and non-assured T-CONTs with the typical assignment of assured and non-assured bandwidth in business services.

4+1 Model—Option B

Figure 6:
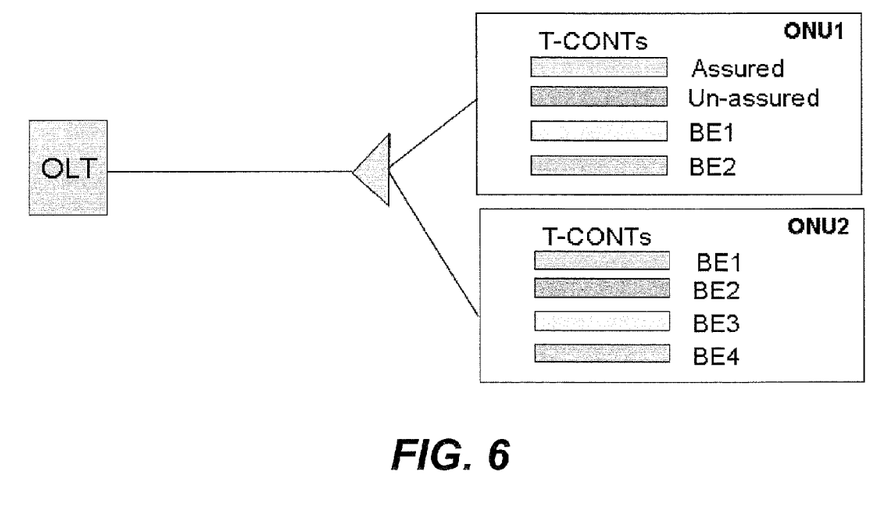

Another option achieves 4 priority classes by introducing several Best Effort classes, as shown in ONU2 in FIG. 6 according to some embodiments. ONU1 uses the same priority mechanism as described above with respect to the 4+1 Model—Option A. Priority levels for ONU2 data in GPON, according to some embodiments, are listed below in the order from high to low:

BE1 (Best Effort) (type 4 or 5)
BE2 (Best Effort) (type 4 or 5)
BE3 (Best Effort) (type 4 or 5)
BE4 (Best Effort) (type 4 or 5)

Exemplary requirements for the 4+1 model—Option B, according to some embodiments, are set forth below:

Requirements
R-60 The OLT MUST support provisioning at least four scheduling precedence levels and also allow assignment of BE T-CONTs to these precedence levels among all the BE T-CONTs in a GPON.

R-61 The OLT SHOULD support provisioning of weights among BE T-CONTs that share the same scheduling precedence level and then schedule (or allocate grants) according to these weights when bandwidth is available for the precedence level.

It should be noted that R-61 did not change from R-59 of the previous example.

Applications: can be used for business and/or consumer applications—however in this configuration, ONU1 may be a business customer and ONU2 may be a consumer. Note that now there is no interaction between the assured/non-assured business bandwidth and the weighting of priority 1 and 2 traffic within the consumer access.

1+1 Model—Option C

Figure 7:
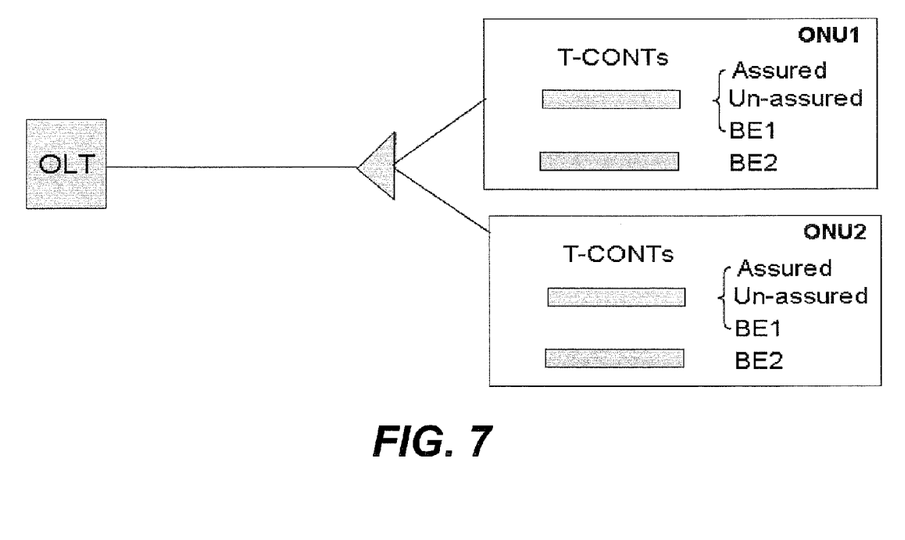

This option represents use of a 1+1 T-CONT model according to some embodiments. It introduces an extra level of Best Effort class by using an additional T-CONT, as shown in FIG. 7. Thus, this option becomes a 2+1 model. It is similar in approach to the 4+1 Model Option A, and exhibits similar potential limitations between business and consumer applications. Priority levels for ONU2 data in GPON, according to some embodiments, are listed below in the order from high to low:

Assured (type 5)
Un-assured (type 5)
BE1 (Best Effort) (type 5)
BE2 (Best Effort) (type 4 or type 5)

The top three level priorities (Assured, un-assured, and BE1) can be accomplished by using a single type 5 T-CONT). BE2 can be achieved through one additional T-CONT using type 4 or type 5 T-CONT.

Exemplary requirements for the 1+1 model—Option C, according to some embodiments, are set forth below:

Requirements
R-62 The OLT MUST support provisioning at least two scheduling BE precedence levels and also allow assignment of BE T-CONTs as well as BE traffic in type-5 T-CONTs to these precedence levels among all the BE and type-5 T-CONTs in a GPON.

R-63 The OLT SHOULD support provisioning of weights among BE T-CONTs and BE traffic in type-5 T-CONTs that share the same scheduling precedence level and then schedule (or allocate grants) according to these weights when bandwidth is available for the precedence level.

There are several mechanisms to distinguish among BE traffic, such as using Type 4 T-CONT for lower precedence of BE2 according to various embodiments.

Applications: can be used for business and/or consumer applications—but this may confound weighting of assured and non-assured traffic among T-CONTs with the typical assignment of assured and non-assured bandwidth in business services.

In some embodiments, drop precedence may be accommodated locally in each ONU and the priority and weighted scheduling among queues be accommodated using the following requirements, which are crafted to support all the cases described above.

R-64 The OLT MUST support provisioning at least four scheduling precedence levels and also allow assignment of type-4 BE T-CONTs as well as BE traffic in type-5 T-CONTs to these precedence levels among all the type-4 and type-5 T-CONTs in a GPON.

R-65 The OLT SHOULD support provisioning of weights among type-4 BE T-CONTs and BE traffic in type-5 T-CONTs that share the same scheduling precedence level and then schedule (or allocate grants) according to these weights when bandwidth is available for the precedence level.

Many variations and modifications can be made to the embodiments described herein without substantially departing from the principles of the present invention. All such variations and modifications are intended to be included herein within the scope of the present invention, as set forth in the following claims.

That which is claimed:

1. A method of managing quality of service in a network that uses time division access and supports a fixed bandwidth traffic type, an assured bandwidth traffic type, an un-assured traffic type, and a best-effort traffic type, comprising:
   supporting provisioning of at least two scheduling precedence levels in the network, none of the at least two precedence levels being associated with the fixed or the assured bandwidth traffic type in the network, but having at least one of a bandwidth precedence and a bandwidth proportion relationship to each other;
   supporting assignment of at least one type-4 transmission container to at least one of the precedence levels; and
   supporting assignment of best-effort traffic in at least one other type-4 or type-5 transmission container to at least one of the precedence levels.

2. The method of claim 1, further comprising:
   provisioning an assured traffic type transmission container associated with a first one of the precedence levels;
   provisioning an un-assured traffic type transmission container associated with a second one of the precedence levels;
   provisioning a first best-effort traffic type transmission container associated with a third one of the precedence levels; and
   provisioning a second best-effort traffic type transmission container associated with a fourth one of the precedence levels.

3. The method of claim 1, further comprising:
   provisioning a first best-effort traffic type transmission container associated with a first one of the precedence levels;
   provisioning a second best-effort traffic type transmission container associated with a second one of the precedence levels;
   provisioning a third best-effort traffic type transmission container associated with a third one of the precedence levels; and
   provisioning a fourth best-effort traffic type transmission container associated with a fourth one of the precedence levels.

4. The method of claim 1, further comprising:
   provisioning a first type 5 transmission container for carrying assured type traffic, un-assured type traffic, and a first best-effort type traffic, which are associated with a first, second, and third one of the precedence levels, respectively; and
   provisioning of a second transmission container for carrying a second best-effort type traffic, which is associated with a fourth one of the precedence levels.

5. The method of claim 1, further comprising:
   supporting provisioning of weights among the type 4 transmission containers and the best effort traffic in the type 5 transmission containers that are assigned to a same one of the precedence levels; and
   supporting scheduling transmission of the type 4 transmission containers and the best effort traffic in the type 5 transmission containers that are assigned to the same one of the precedence levels when bandwidth is available for the same one of the precedence levels.

6. The method of claim 1, wherein the network is a gigabit passive optical.

7. A system for managing quality of service in a network that uses time division access and supports a fixed bandwidth traffic type, an assured bandwidth traffic type, an un-assured traffic type, and a best-effort traffic type, comprising:
   an access node element that is configured to support provisioning of at least two scheduling precedence levels in the network, none of the at least two precedence levels being associated with the fixed or the assured bandwidth traffic type in the network, but having at least one of a bandwidth precedence and a bandwidth proportion relationship to each other, to support assignment of at least one type-4 transmission container to at least one of the precedence levels, and to support assignment of best-effort traffic in at least one other type-4 or type-5 transmission container to at least one of the precedence levels.

8. The system of claim 7, wherein the access node is further configured to:
   provision an assured traffic type transmission container associated with a first one of the precedence levels;
   provision an un-assured traffic type transmission container associated with a second one of the precedence levels;
   provision a first best-effort traffic type transmission container associated with a third one of the precedence levels; and
   provision a second best-effort traffic type transmission container associated with a fourth one of the precedence levels.

9. The system of claim 7, wherein the access node is further configured to:
   provision a first best-effort traffic type transmission container associated with a first one of the precedence levels;
   provision a second best-effort traffic type transmission container associated with a second one of the precedence levels;
   provision a third best-effort traffic type transmission container associated with a third one of the precedence levels; and
   provision a fourth best-effort traffic type transmission container associated with a fourth one of the precedence levels.

10. The system of claim 7, wherein the access node is further configured to:
provision a first type 5 transmission container for carrying assured type traffic, un-assured type traffic, and a first best-effort type traffic, which are associated with a first, second, and third one of the precedence levels, respectively; and
provision of a second transmission container for carrying a second best-effort type traffic, which is associated with a fourth one of the precedence levels.

11. The system of claim 7, wherein the access node is further configured to:
support provisioning of weights among the type-4 transmission containers and the best effort traffic in the type 5 transmission containers that are assigned to a same one of the precedence levels; and
support scheduling transmission of the type 4 transmission containers and the best effort traffic in the type-5 transmission containers that are assigned to the same one of the precedence levels when bandwidth is available for the same one of the precedence levels.

12. The system of claim 7, wherein the network is a gigabit passive optical network and wherein the access node comprises an optical line terminal.

13. A computer program product for managing quality of service in a network that uses time division access and supports a fixed bandwidth traffic type, an assured bandwidth traffic type, an un-assured traffic type, and a best-effort traffic type, comprising:
a computer readable storage medium having computer readable program code embodied therein, the computer readable program code comprising:
computer readable program code configured to support provisioning of at least two scheduling precedence levels in the network, none of the at least two precedence levels being associated with the fixed or the assured bandwidth traffic type in the network, but having at least one of a bandwidth precedence and a bandwidth proportion relationship to each other;
computer readable program code configured to support assignment of at least one type-4 transmission container to at least one of the precedence levels; and
computer readable program code configured to support assignment of best-effort traffic in at least one other type-4 or type-5 transmission container to at least one of the precedence levels.

14. The computer program product of claim 13, further comprising:
computer readable program code configured to provision an assured traffic type transmission container associated with a first one of the precedence levels;
computer readable program code configured to provision an un-assured traffic type transmission container associated with a second one of the precedence levels;
computer readable program code configured to provision a first best-effort traffic type transmission container associated with a third one of the precedence levels; and
computer readable program code configured to provision a second best-effort traffic type transmission container associated with a fourth one of the precedence levels.

15. The computer program product of claim 13, further comprising:
computer readable program code configured to provision a first best-effort traffic type transmission container associated with a first one of the precedence levels;
computer readable program code configured to provision a second best-effort traffic type transmission container associated with a second one of the precedence levels;
computer readable program code configured to provision a third best-effort traffic type transmission container associated with a third one of the precedence levels; and
computer readable program code configured to provision a fourth best-effort traffic type transmission container associated with a fourth one of the precedence levels.

16. The computer program product of claim 13, further comprising:
computer readable program code configured to provisioning a first type 5 transmission container for carrying assured type traffic, un-assured type traffic, and a first best-effort type traffic, which are associated with a first, second, and third one of the precedence levels, respectively; and
computer readable program code configured to provision of a second transmission container for carrying a second best-effort type traffic, which is associated with a fourth one of the precedence levels.

17. The computer program product of claim 13, further comprising:
computer readable program code configured to support provisioning of weights among the type 4 transmission containers and the best effort traffic in the type-5 transmission containers that are assigned to a same one of the precedence levels; and
computer readable program code configured to support scheduling transmission of the type 4 transmission containers and the best effort traffic in the type 5 transmission containers that are assigned to the same one of the precedence levels when bandwidth is available for the same one of the precedence levels.

* * * * *

UNITED STATES PATENT AND TRADEMARK OFFICE
CERTIFICATE OF CORRECTION

PATENT NO.        : 7,813,353 B2                                          Page 1 of 1
APPLICATION NO.   : 12/254114
DATED             : October 12, 2010
INVENTOR(S)       : Anschutz et al.

It is certified that error appears in the above-identified patent and that said Letters Patent is hereby corrected as shown below:

In the Claims:
Column 12, Claim 4, Line 5: Please correct "type 5" to read -- type-5 --
        Claim 5, Line 14: Please correct "type 4" to read -- type-4 --
              Lines 15-16: Please correct "type 5" to read -- type-5 --
              Lines 18: Please correct "type 4" to read -- type-4 --
              Lines 19: Please correct "type 5" to read -- type-5 --
        Claim 6, Line 24: Please correct "optical." to read -- optical network. --
Column 13, Claim 10, Line 3: Please correct "type 5" to read -- type-5 --
        Claim 11, Lines 14-15: Please correct "type 5" to read -- type-5 --
              Line 17: Please correct "type 4" to read -- type-4 --
Column 14, Claim 16, Line 27: Please correct "type 5" to read -- type-5 --
        Claim 17, Line 40: Please correct "type 4" to read -- type-4 --
              Line 45: Please correct "type 4" to read -- type-4 --
              Line 46: Please correct "type 5" to read -- type-5 --

Signed and Sealed this
Seventh Day of February, 2012

David J. Kappos
*Director of the United States Patent and Trademark Office*